United States Patent
Polk et al.

(10) Patent No.: US 7,693,060 B2
(45) Date of Patent: Apr. 6, 2010

(54) METHOD AND APPARATUS FOR A RESERVATION REFLECTOR FUNCTION IN ROUTERS

(75) Inventors: James M. Polk, Colleyville, TX (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 11/974,501

(22) Filed: Oct. 12, 2007

(65) Prior Publication Data

US 2009/0097403 A1 Apr. 16, 2009

(51) Int. Cl.
*H04L 12/26* (2006.01)

(52) U.S. Cl. .................. 370/231; 370/230; 370/329
(58) Field of Classification Search .......... None
See application file for complete search history.

(56) References Cited

U.S. PATENT DOCUMENTS

| | | | |
|---|---|---|---|
| 2001/0056459 A1* | 12/2001 | Kurose et al. | 709/201 |
| 2002/0072383 A1* | 6/2002 | Helm et al. | 455/509 |
| 2002/0181462 A1* | 12/2002 | Surdila et al. | 370/392 |
| 2005/0238049 A1* | 10/2005 | Delregno | 370/466 |
| 2005/0262264 A1* | 11/2005 | Ando et al. | 709/233 |
| 2006/0259641 A1* | 11/2006 | Kim et al. | 709/245 |
| 2007/0217349 A1* | 9/2007 | Fodor et al. | 370/310.2 |

FOREIGN PATENT DOCUMENTS

| | | |
|---|---|---|
| GB | 2 393 071 A | 3/2004 |
| WO | WO 2009/049004 A2 | 4/2009 |

OTHER PUBLICATIONS

Le Faucheur, F. et al. "RSVP Proxy Approaches" Network Working Group, (2007).
Braden, R., et al., "Version 1 Functional Specification; rfc2205.txt," IETF Internet Engineering Task Force, Chapters 1 and 2, (Sep. 1, 1997).
International Search Report and Written Opinion of PCT/US2008/079279, date of mailing Mar. 23, 2009.

* cited by examiner

*Primary Examiner*—Pankaj Kumar
*Assistant Examiner*—Ajay P Cattungal
(74) *Attorney, Agent, or Firm*—Hamilton, Brook, Smith & Reynolds, P.C.

(57) ABSTRACT

A method and corresponding apparatus establish a reservation in a segment of an end-to-end path between a data sender and a data receiver, up to a point in the end-to-end path; attempt to establish another reservation in an adjacent segment of the end-to-end path, beyond the point in the end-to-end path; and in an event that the other reservation is established in the adjacent segment of the end-to-end path, bind the other reservation to the reservation established in the segment of an end-to-end path up to the point in the end-to-end path.

22 Claims, 12 Drawing Sheets

US 7,693,060 B2

METHOD AND APPARATUS FOR A RESERVATION REFLECTOR FUNCTION IN ROUTERS

TECHNICAL FIELD

The present disclosure relates generally to establishing reservations for network layer resources.

BACKGROUND

Between a sender and a receiver exists a datapath (path) over which application data flows (dataflow or flow) between the sender and receiver. Reserving network layer resources for the dataflow provides a quality of service (QoS) to the sender and the receiver for that dataflow. Resource reservation protocols reserve network layer resources for data flows. In an "on-path" resource reservation protocol, such as Resource ReSerVation Protocol (RSVP), Next Step In Signaling (NSIS), and Network Layer Signaling (NLS), protocol messaging or signaling are communicated or otherwise exchanged over the datapath of the dataflow between the sender and receiver. For example, in a Voice Over IP (VoIP) call between a calling party (sender) and a called party (receiver), resource reservation messages or signals (e.g., RSVP PATH and RESV messages) reserving network layer resources for the call are communicated on the same datapath as application data or media data (e.g., Real-Time Transport Protocol (RTP) packets).

A dataflow extends in a downstream direction from a sender to a receiver and may traverse one or more intermediate nodes internetworking the sender and the receiver. Conversely, the dataflow extends in an opposite direction from the receiver to the sender, again traversing any intermediate node internetworking the sender and the receiver. As such, to provide QoS between the sender at one end and the receiver at another end, reserving network layer resources for an end-to-end datapath requires reserving network layer resources not only at the sender and the receiver, but also at intermediate nodes internetworking the sender and the receiver. This is referred to as installing an end-to-end reservation.

Many factors conspire against installing an end-to-end reservation. A sender and a receiver are likely to belong to different administrative domains administrated by different providers. Additionally, it is likely that between the administrative domains, to which the sender and the receiver belong, there are additional or "transit" domains administered by still different providers. As such, a dataflow between the sender and the receiver may flow over a datapath which traverses several administrative domains, each using a different resource reservation protocol that is incompatible with one another, or choose to not have a reservation protocol configured for use within any one of the administrative domains. Thus, interoperability between domains may hinder installing an end-to-end reservation.

Even if all administrative domains, through which a datapath traverses, use the same resource reservation protocol or the resource reservation protocols used are all compatible with one another, it is unlikely a provider would permit or otherwise grant permission to a host or node outside of its administrative domain to reserve network layer resources within its domain. Thus, policy considerations also hinder installing an end-to-end reservation.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating example embodiments.

DESCRIPTION OF EXAMPLE EMBODIMENTS

Overview

Installing an end-to-end reservation between a sender and a receiver may not be possible or achievable. This should not, however, limit or otherwise prevent network layer resources for some portion or segment of a datapath path between the sender and the receiver to be reserved. Accordingly, a more pragmatic approach or technique, one that addresses the end-to-end mandate problem, is to establish a reservation in a segment of an end-to-end path between a data sender and a data receiver, up to a configured point in the end-to-end path; attempt to establish another reservation in an adjacent segment along the end-to-end path, beyond the point in the end-to-end path; and in an event that the other reservation is established in the adjacent segment of the end-to-end path, binding the other reservation to the reservation established in the segment of an end-to-end path up to that point in the end-to-end path.

This technique enables each segment of an end-to-end datapath between a sender and receiver to establish its own reservation, with adjacent segments bound to one other to emulate a single, larger reservation. The technique strives to establish a reservation in as many segments of the end-to-end datapath as possible and is predicated on the notion that establishing reservations in some segments of the end-to-end datapath is far better than establishing no reservations at all.

Figure 1:
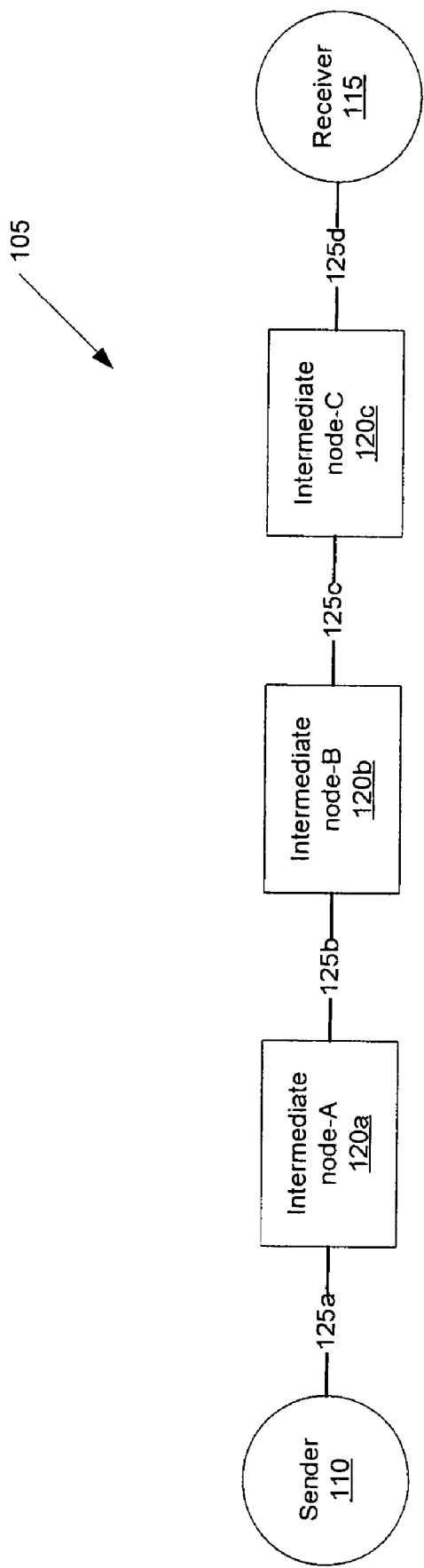
FIG. 1 is an example datapath between a sender and a receiver.

In FIG. 1, an example datapath 105 exists between a data application sender 110 and a data application receiver 115 through which the sender 110 and the receiver 115 communicate. Internetworking or otherwise connecting the sender 110 and the receiver 115 is a series of intermediate nodes 120a . . . c. A communication between the sender 110 and the receiver 115 is first communicated from the sender 110 to an intermediate node-A 120a. The intermediate node-A 120a in turn, forwards the communication to another intermediate node-B 120b, and so on, until the communication reaches the receiver 115.

For the sake of convenience and purposes of describing example embodiments, a downstream direction is defined as being away from the sender 110 and towards the receiver 115. Conversely, an upstream direction is defined as being towards the sender 110 and away from the receiver 115. An intermediate node in the downstream direction is referred to as a next hop, while an intermediate node in the upstream direction is referred to as a previous hop. For example in FIG. 1, the intermediate node-B 120b is downstream from the intermediate node-A 120a, and thus, is the next hop from the intermediate node-A 120a. The intermediate node-B 120b is upstream from an intermediate node-C 120c, and thus, is the previous hop to the intermediate node-C 120c.

FIG. 1 further illustrates the datapath 105 is organized into portions or segments. In particular, a portion of the datapath 105, a segment-A 125a, exists between the sender 110 and the intermediate node-A 120a. Another portion of the datapath 105, a segment-B 125b, exists between the intermediate node-A 120a and the intermediate node-B 120b. Likewise, portions of the datapath 105, a segment-C 125c and a segment-D 125d, exist between the intermediate node-B 120b and the intermediate node-C 120c; and the intermediate node-C 120c and the receiver 115, respectively.

Individually, each segment is but a portion of the complete or end-to-end datapath 105 between the sender 110 and the receiver 115. However, collectively the segments 125a . . . d define and otherwise describe the datapath 105 in its entirety.

Over the datapath 105 flows application data, referred to hereinafter as a dataflow, between the sender 110 and the receiver 115. A dataflow is a sequence of messages that have the same source address and same destination address. The dataflow may be a unicast (i.e., destined from one destination host) or a multicast (i.e., destined for several destination hosts). Dataflows are unidirectional in that data travels over a dataflow from the sender 110 to the receiver 115. End-to-end dataflows do not have to traverse the same datapath, and thus the exact same intermediate nodes in the forward and reserve directions, but may traverse unique datapath in each direction. One or more data flows having the same unicast or multicast destination address may be collected into a session. Sessions typically utilize port and protocol numbers much like dataflows. Sessions differ from dataflows in that a session may have multiple senders, whereas a dataflow only originates from a single sender. One skilled in the art will readily recognize that principles of the example embodiments apply to both a dataflow and a session. Throughout the specification the terms dataflow and session are used interchangeably.

Some applications may incorporate dataflows configured to transfer time-sensitive traffic from a source (sender) in a data network to a destination (receiver) in the network in accordance with a certain "quality of service" (QoS) associated with each dataflow. Here, network layer resources may be reserved for a dataflow to ensure that the QoS associated with the dataflow is maintained.

Continuing to refer to FIG. 1, nodes on the datapath 105 (including the sender 110 and the receiver 115) may each reserve network layer resources for a dataflow and as such, it may be said that the datapath 105 establishes a reservation for the dataflow between the sender 110 and the receiver 115. When the datapath 105 is organized into segments 125a . . . d, nodes on each segment of the datapath 105 each reserve network layer resources for the dataflow. Accordingly, it may be said that each segment of the datapath 105 establishes a reservation for the dataflow between the sender 110 and the receiver 115. It is important to note that a complete datapath establishing a reservation is not the same as an individual segment establishing a reservation.

In contrast to simply partitioning a datapath into segments to create segmented reservations for a dataflow/session, example embodiments define a reflection point in a network infrastructure. The reflection point emulates a per-hop reservation behavior while continuing to attempt to reserve network layer resources towards a receiver, such as a called endpoint. As will be described further herein, having defined such a reflection point, the following are achievable:

(1) If a reservation protocol in one segment differs from a reservation protocol in an adjacent segment, but each are mapped onto each other, the difference is transparent to a dataflow/session.

(2) If a reservation for a segment cannot be accepted or a reservation protocol is not enabled for whatever reason, for example, because of a policy-based decision, the segment will not establish a reservation. However, failure of the segment to establish the reservation does not affect adjacent segments from establishing reservations for a dataflow/session.

(3) If a reservation for a segment is denied initially, the segment may continue to attempt to establish a reservation for a dataflow/session.

(4) If a reservation for a segment is torn down after establishing the reservation, for example, the reservation is preempted by another reservation, the torn down segment may continue to attempt to re-establish a reservation for a dataflow/session.

Network layer resources may be reserved for a dataflow to ensure that a QoS associated with the dataflow is maintained using an "on-path" resource reservation protocol, such as Resource ReSerVation Protocol (RSVP), Next Step In Signaling (NSIS), and Network Layer Signaling (NLS). In an "on-path" resource reservation protocol, protocol messaging or signaling is communicated or otherwise exchanged over the same datapath as used for the dataflow between a sender and receiver.

Using RSVP as an example, RSVP works in conjunction with routing protocols, such as the Routing Information Protocol (RIP), Open Shortest Path First (OSPF), and Border Gateway Protocol (BGP), to reserve network layer resources for dataflows in a data network in order to establish a level of QoS required by the dataflows. RSVP is defined in R. Braden, et al., "Resource ReSerVation Protocol (RSVP)," Request For Comments (RFC) 2205.

RSVP defines two fundamental types of signaling messages, a RSVP path (PATH) message and a RSVP reservation request (RESV) message. PATH messages are sent by senders to identify themselves and indicate network layer resources (e.g., bandwidth) needed to receive their programming or content. The PATH messages make intermediate nodes on a datapath aware of the possibility that a reservation of network layer resources may be required. The PATH messages proceed from one intermediate node to another intermediate node on the datapath, "hop-by-hop," through the data network to one or more receivers. The PATH messages store a "path state" in each intermediate node on the datapath. The path state is then used by the intermediate nodes to route reservation-request messages in the reverse direction.

If a receiver is interested in the programming or content offered by a particular sender, it responds with a RESV message to reserve resources for a dataflow between the sender and receiver. The RESV message specifies network layer resources needed to accommodate the dataflow. The RESV message travels hop-by-hop on the same datapath taken by the PATH message but in the reverse direction back to the sender.

At each hop, the corresponding intermediate node installs or otherwise establishes a reservation for the receiver by setting aside (reserving) network layer resources specified in the RESV message for the dataflow. These resources are immediately made available to the dataflow. If network layer resources are not available, the reservation may be refused explicitly so that the receiver knows it cannot depend on the corresponding network layer resources being devoted to its application data (traffic). By using RSVP, packets carrying, e.g., time-sensitive information can be accorded the network layer resources and services they need to ensure timely and consistent delivery.

Figure 2:
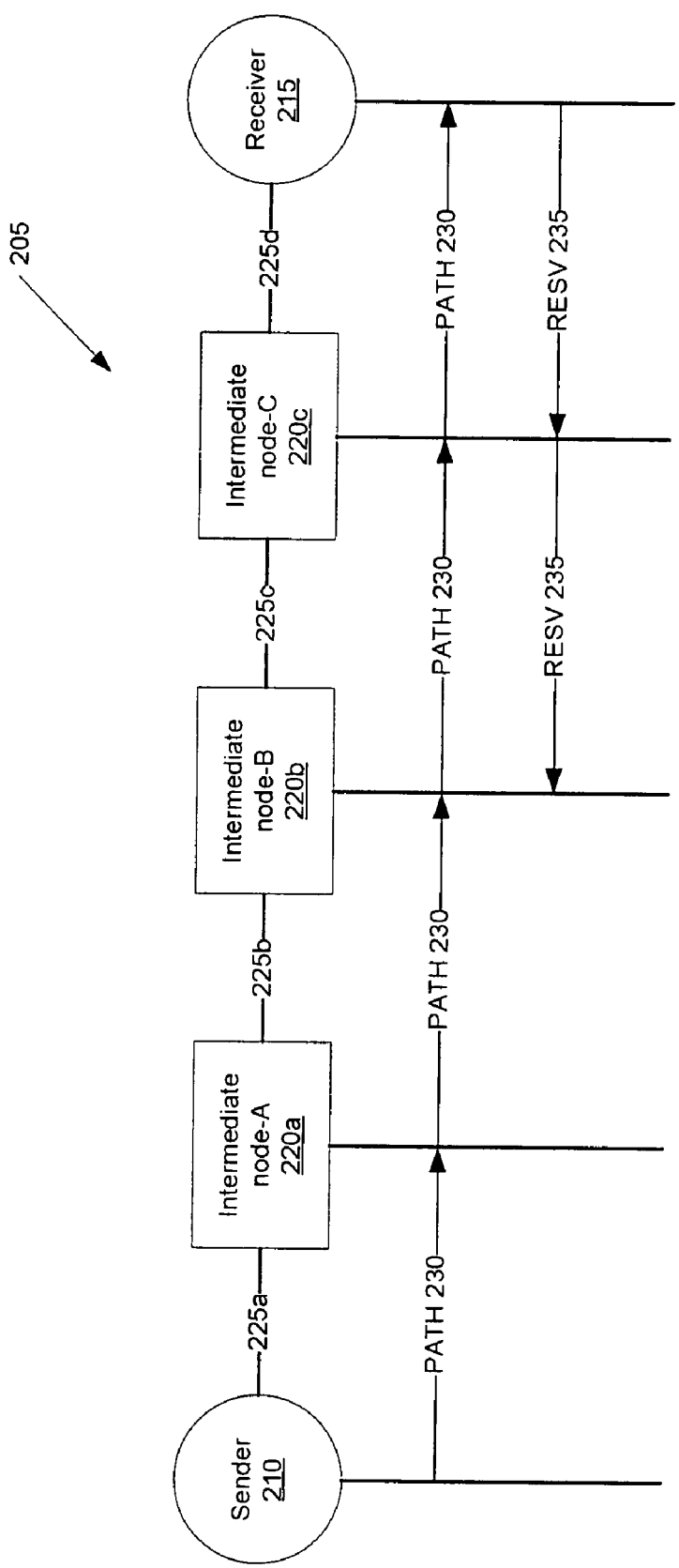
FIG. 2 is an example message diagram of establishing a reservation using RSVP.

To further illustrate "on-path" resource reservation protocols, such as RSVP, in FIG. 2, an example datapath 205 exists between a data application sender 210 and a data application receiver 215 through which the sender 210 and the receiver 215 communicate. Internetworking the sender 210 and the receiver 215 is a series of intermediate nodes 220a . . . c.

Using RSVP as example, the sender 210 sends a PATH message 230 identifying the sender 210 and indicating network layer resources (e.g., bandwidth) needed to receive programming or content from the sender 210. The PATH message 230 informs the intermediate nodes 220a . . . c of the possibility that a reservation of network layer resources may be required. The PATH message 230 is also used to store a "path state" in each intermediate node 220a . . . c on the datapath 205. The path state is then used by the intermediate nodes 220a . . . c to route reservation-request messages in the reverse direction.

The receiver 215, interested in the programming or content offered by the sender 210, responds with a RESV message 235 to reserve resources for a dataflow between the sender 210 and the receiver 215. The RESV message 235 specifies network layer resources needed to accommodate the dataflow. The RESV message 235 travels hop-by-hop on the same datapath 205 taken by the PATH message 230 but in the reverse direction back to the sender 210.

At each intermediate node 220a . . . c, receiving the RESV message 235 triggers two general actions as follows: (1) establishing a reservation on the datapath 205 by first determining whether there are sufficient resources to accommodate the specific request (admission control), then determining whether the receiver 215 (requester) associated with the reservation has correct privileges (policy control); and (2) forwarding the RESV message 235 upstream towards the sender 210.

If both admission control and policy control succeed, the intermediate nodes 220a . . . c establish the reservation on the datapath 205 by setting a packet classifier to select data packets of a dataflow defined in the RESV message 235, and interacting with an appropriate link layer to obtain a desired QoS for the dataflow defined in the RESV message 235. If either admission control or policy control fails, however, the reservation is rejected and an error message is returned to the receiver 215. The RESV message 235 is not forwarded upstream towards the sender 210 and a RESVERR message is sent indicating an error in establishing the reservation. The type of error included in the RESVERR message provides the sender 210 a reason why the reservation could not be established at that time.

In the example illustrated in FIG. 2, the intermediate node-C 220c receives the RESV message 235 from the receiver 215 and establishes the resource reservation as requested in the RESV message 235. The intermediate node-C 220c forwards the RESV message 235 to the intermediate node-B 220b. The intermediate node-B 220b, however, rejects the RESV message 235 and does not establish the requested resource reservation.

The intermediate node-B 220b may not establish the requested resource reservation because, for example, the intermediate node-B 220b lacks sufficient network layer resources for the requested resource reservation (admission control failure) or the receiver is not privileged to request the intermediate node-B 220b to reserve network layer resources for the requested resource reservation (policy control failure). Because the intermediate node-B 220b rejects the requested resource reservation, the intermediate node-B 220b does not forward the RESV message 235 to a previous-hop, the intermediate node-A 220a.

Consequently, nodes upstream from the intermediate node-B 220b, including the sender 210, do not receive the RESV message 235, and thus, are not requested to reserve network layer resources. Without network layer resources reserved from the sender 210 to the receiver 215, an end-to-end reservation for a dataflow between the sender 210 to the receiver 215 cannot be established and a QoS for the dataflow cannot be provided.

From the above example of an "on-path" resource reservation protocol, of which RVSP is but one example, it is important to note and it is of particular relevance to further discussions describing example embodiments:

(1) a receiver sends a resource reservation request and intermediate nodes forward the resource reservation request;

(2) an intermediate node failing to receive a resource reservation request does not establish a reservation and reserve network layer resources; and (3) an end-to-end datapath establishing a reservation between a sender and a receiver requires "cooperative" admission and policy controls at each intermediate node on the end-to-end datapath; an unlikely situation where the end-to-end datapath traverses multiple administrative domains In contrast to the foregoing "all-or-nothing" approach to resource reservation, example embodiments embrace the notion that establishing some resource reservation is far better than establishing no resource reservation. By introducing a reflection point or reflector (e.g., on an edge router located at the perimeter of a provider's administrative domain) to "reflect" a reservation, an "on-path" resource reservation protocol may be used through the provider's administrative domain to the provider's peering point in an adjacent administrative domain (i.e., a place where networks from two or more providers interconnect together to exchange traffic). In this way, the provider may provide its customers with a quality of service (QoS) without being limited by an adjacent administrative domain's implementation of a resource reservation protocol. In fact, whether an adjacent administrative domain's chooses to implement a resource reservation protocol at all does not limit the QoS provided by the provider to its customers.

Figure 3A:
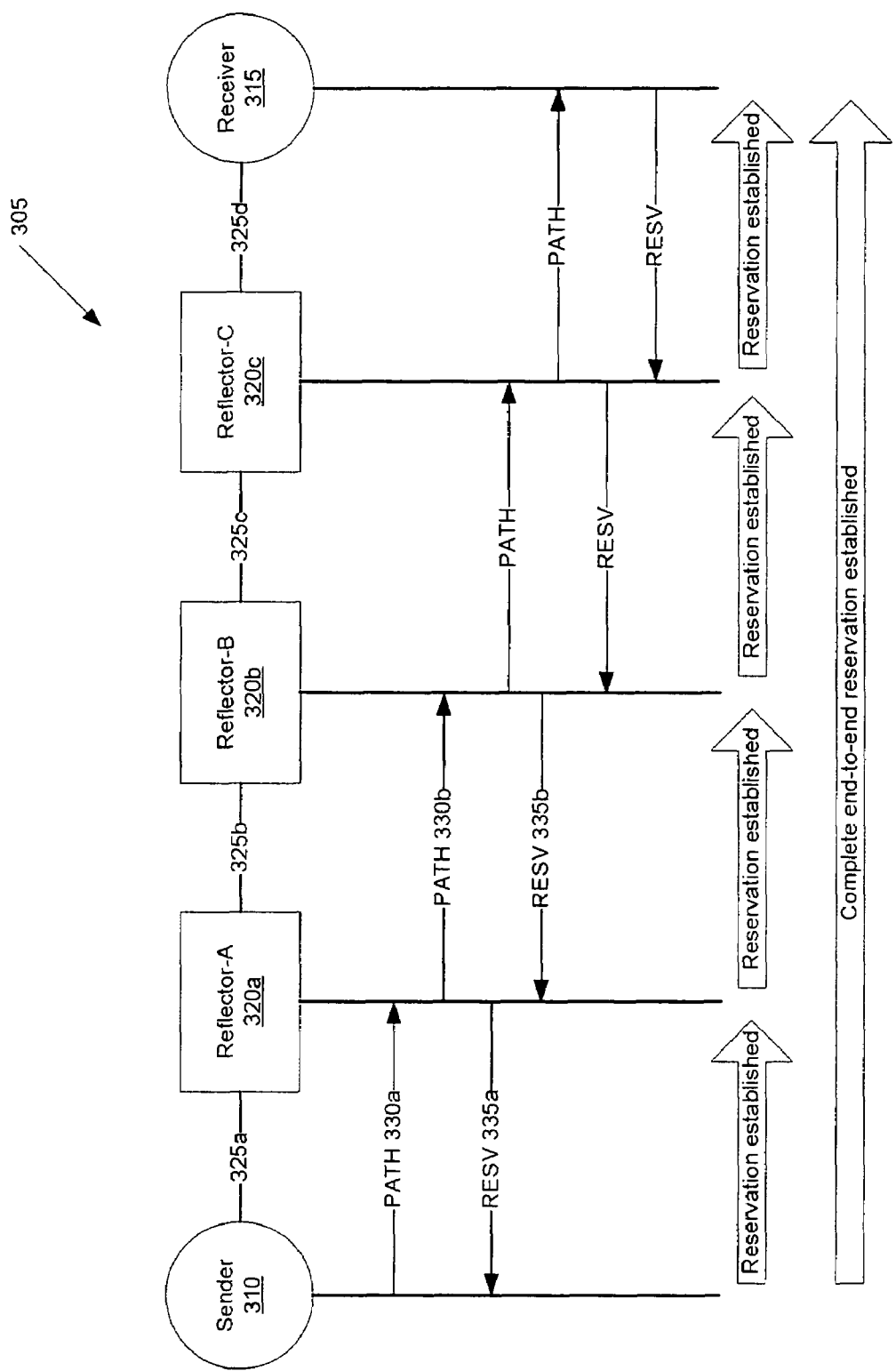
FIG. 3A is an example message diagram of establishing a complete end-to-end reservation one segment at a time.

In FIG. 3A, using RSVP as an example "on-path" reservation protocol, an example end-to-end datapath 305 exists between a sender 310 and a receiver 315. The end-to-end datapath 305 is segmented or otherwise divided into segments 320a . . . d by respective intermediate nodes 320a . . . c. The sender 310 and the receiver 315 are internetworked by the intermediate nodes 320a . . . c. The intermediate nodes 320a . . . c each have a reflector function of the example embodiments and as such, are hereinafter referred to as reflectors 320a . . . c.

The sender 310 having application data to send to the receiver 315 initiates a resource reservation, in this example, by sending a first PATH message 330a downstream on the end-to-end datapath 305 towards the receiver 315. A reflector-A 320a establishes a resource reservation in a segment-A 325a in response to the first PATH message 330a. In particular, the reflector-A 320a reserves network layer resources for a dataflow from the sender 310 to the receiver 315 on the segment-A 325*a*. Because, the PATH message 230 stores the "path state" in each intermediate node 220*a* . . . *c* on the datapath 205, in this example embodiment, it may be said that the reflector-A 320*a* establishes the reservation in response to a path state of the end-to-end datapath 305 between the sender 310 and the receiver 315 being stored.

Figure 3B:
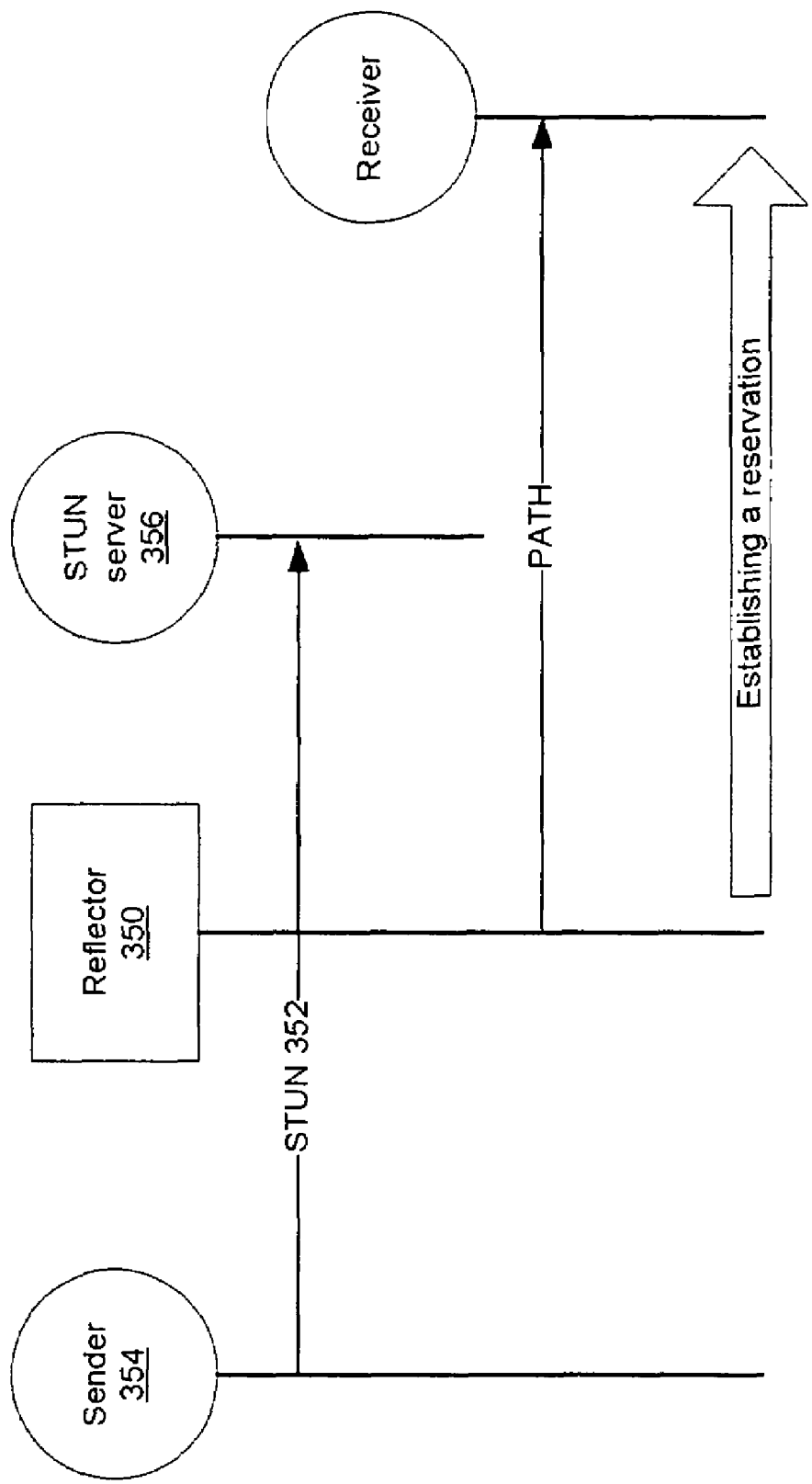
FIGS. 3B and 3C are example message diagrams of establishing and attempting to establish a reservation.

In an example embodiment, a reflector establishes a reservation in response to receiving application data, such as RTP packets of a VoIP call, or a message communicated on an end-to-end datapath between a sender and a receiver. For example, in FIG. 3B, a reflector 350 establishes a reservation in response to receiving a Simple Traversal of User Datagram Protocol (UDP) through Network Address Translators (NAT) (STUN) packet 352 from a sender 354 that is destined from a STUN server 356.

STUN is a client-server protocol allowing a client behind a NAT router (or multiple NAT routers) to find out its public address, the type of NAT it is behind, and the internet-side port associated by the NAT router with a particular local port. STUN is defined in J. Rosenberg et al., "STUN—Simple Traversal of User Datagram Protocol (UDP) Through Network Address Translators (NATs)," RFC 3489.

In another example, a reflector establishes a reservation in response to receiving a Session Initiation Protocol (SIP) INVITE message. SIP is an application-layer control (signaling) protocol for creating, modifying, and terminating sessions with one or more participants. SIP can be used to create two-party, multiparty, or multicast sessions that include Internet telephone calls, multimedia distribution, and multimedia conferences. SIP is defined in J. Rosenberg et al., "SIP: Session Initiation Protocol," RFC 3261.

It should readily apparent that the above examples are not intended to limit example embodiments to STUN and SIP messages, but rather include establishing a reservations in response to receiving other messages communicated on an end-to-end datapath between a sender and a receiver.

Moreover, it should be clear from the above example embodiments that reflecting a reservation does not require a call signaling entity, such as a call configuration manager (CCM) or a session border controller (SBC). However, in some instances, it may be advantageous for a reflector to be invoked by such a call signaling entity, for example, when a sender is not capable of initiating a reservation request on its own.

Returning to the example in FIG. 3A, using RSVP, the reflector-A 320*a* responds to the first PATH message 330*a* from the sender 310 by sending a first RESV message 335*a*. The first RESV message 335*a* requests that network layer resources for the dataflow on the segment-A 325*a* be reserved. In this way, the reflector-A 320*a* establishes the reservation in the segment-A 325*a* up to a point in the end-to-end datapath 305 between the sender 310 and the receiver 315, namely, up to the reflector-A 320*a*. As such, a reflector (i.e., a router implementing a reflector function) may be said to establish a reservation for a data flow in a segment upstream of the reflector. Moreover, a reflector may be said to act as a completer by completing a reservation request from a previous hop.

In addition to establishing a reservation in a segment upstream of the reflector, the reflector-A 320*a* attempts to establish a reservation in an adjacent segment, a segment-B 325*b*, downstream from the reflector-A 320*a*. In particular, the reflector-A 320*a* attempts to reserve network layer resources for the dataflow from the sender 310 to the receiver 315 in the segment-B 325*b*.

In this example, using RSVP, the reflector-A 320*a* in response to the first PATH message 330*a* (i.e., a received PATH message) composes a second PATH message 330*b* based on the received first PATH message 330*a* and sends the second PATH message 330*b* downstream towards the receiver 315. In some instances, for example, to conform to an administrative rule, the reflector-A 320*a* translates a policy element of the first PATH message and composes the second PATH message 330*b* with the translated policy element.

In an example embodiment, a reflector decides based on a policy decision whether to attempt to establish another reservation in an adjacent segment, beyond a point in an end-to-end datapath.

Figure 3C:
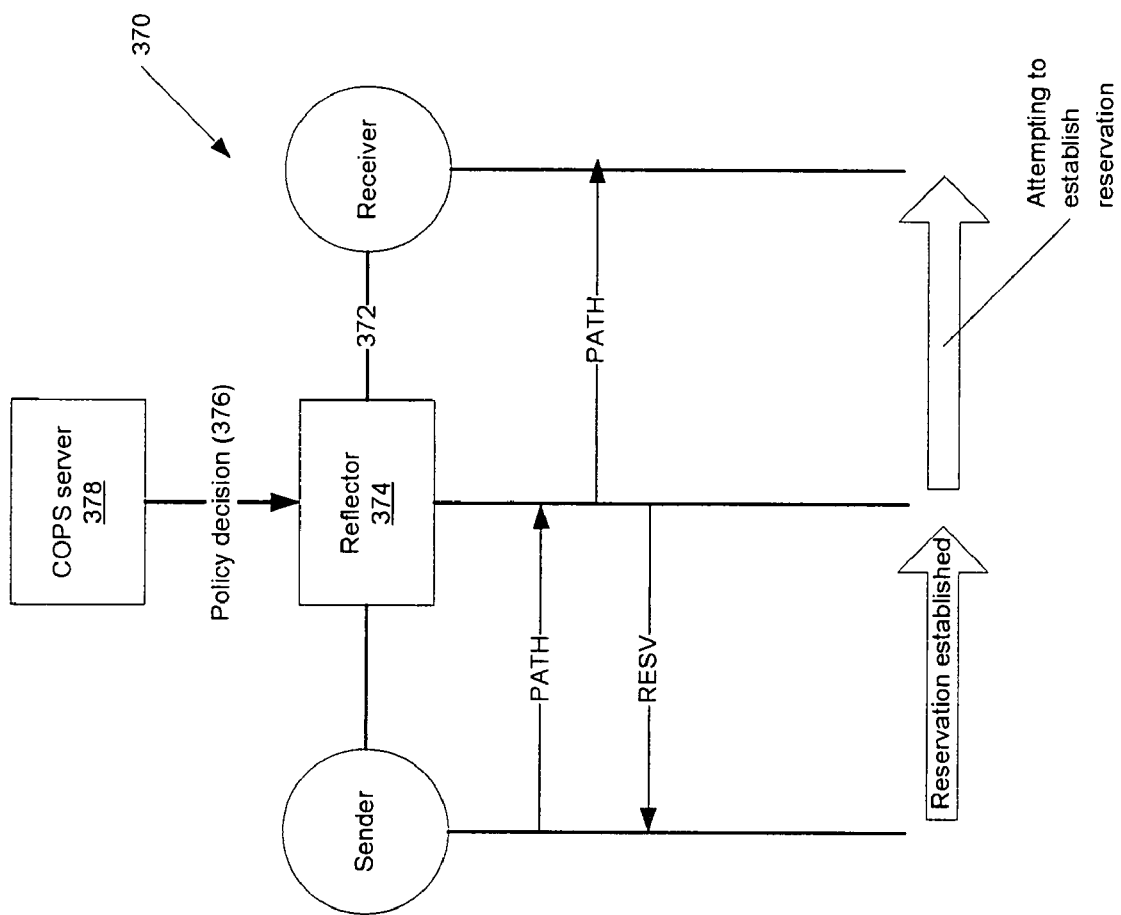

In another example embodiment, a policy decision is communicated from a policy control entity not on an end-to-end datapath between a sender and a receiver, but is aware of the end-to-end datapath. For example, in FIG. 3C, a reflector 370 having established a reservation in a first segment 372 of an end-to-end datapath 374, decides whether to attempt to establish another reservation in an adjacent segment 376 based on a policy decision 378. The reflector 370 is informed of the policy decision 378 by a policy control entity 380 implementing the Common Open Policy Service (COPS) protocol defined in D. Durham et al., "The COPS (Common Open Policy Service) Protocol," RFC 2748, hereinafter referred to a COPS server.

COPS is a network layer management protocol for communicating network layer traffic policy information to network devices. "On-path" resource reservation protocols, such as RSVP, on the other hand are network layer control/signaling protocols for establishing reservation and reserving network layer resources. As such, COPS and RSVP, for example, may be used together as described in S. Herzog et al., "COPS usage for RSVP," RFC 2749.

The COPS server 380 communicates the policy decision 378 to the reflector 370, informing the reflector 370 to attempt to establish the other reservation in the adjacent segment 376, beyond the point in the end-to-end datapath 374. The reflector 370, having been so informed then attempts to establish the other reservation in the adjacent segment 376. One skilled in the art will readily recognize that the above example is not intended to limit example embodiments to COPS, but rather include other servers, protocols or mechanisms for communicating network layer traffic policy information to the reflector 370.

Returning to FIG. 3A, as before, the reflector-B 320*b* responds to the second PATH message 330*b* from the reflector-A 320*a* by sending a second RESV message 335*b*. The second RESV message 335*b* requests that network layer resources for the dataflow in the segment-B 325*b* be reserved. In this way, the reflector-B 320*b* completes or otherwise establishes the other reservation in the segment-B 325*b*, up to a point in the end-to-end datapath 305 between the sender 310 and the receiver 315, namely, up to the reflector-B 320*b*.

The reflector-A 320*a* binds the reservation established in the segment-A 325*a* to the other reservation established in the adjacent segment-B 325*b* forming a single bound reservation. So far, in this example, a reservation spanning a portion of the end-to-end datapath 305, namely, the segments 325*a* and 325*b* has been established. Network layer resources for the dataflow from the sender 310 to the receiver 315 are reserved in the segments 325*a* and 325*b*. As such, communications from the sender 310 to the receiver 315 receive a quality of service for a least a portion of the end-to-end datapath 305.

In some instances, the reflector-A 320*a* stops performing the reflector function to bind the established reservations, for example, when the reservation established in the segment-A 325*a* is the same as the reservation established in the adjacent segment-B 325*b*. This may be the case when the segment-A 325a and the segment-B 325b are in the same administrative domain administrated by a single provider. However, as will be described later, this is not always the case. The reflector-A 320a stops establishing the reservation in the segment-A 325a, stops attempting to establish the other reservation in the adjacent segment-B 325b, and stops binding established reservations. In other words, the reflector-A 320a becomes an intermediate node without the reflector function (e.g., the intermediate nodes 120a . . . d of FIG. 1).

In particular, using RSVP as an example, an intermediate node forwards a received PATH message in response to receiving the PATH message. In contrast, the reflector-A 320a returns RESV message in response to receiving a PATH message to establish or otherwise complete a reservation. In further contrast, the intermediate node reserves network layer resources in response to receiving an RSVP RESV from a next hop, not a PATH message received from a previous hop.

The reflector-B 320b, on the other hand, continues to perform the reflector function by establishing the other reservation in the segment-B 325b, attempting to establish another reservation in an adjacent segment, the segment-C 325c, and binding the reservations established in the segment-B 325b and the segment-C 325c. The foregoing continues, each reflector establishing a reservation in a segment, attempting to establish another reservation in an adjacent segment, and binding reservations established in the segment and adjacent segments. In this way a reservation is established for an end-to-end datapath a segment at a time. However, the reservation established for the end-to-end datapath need not be continuous, but as will be described later may have one or more segments in which no reservation is established. Again, example embodiments are predicated on the notion that establishing reservations in some segments of a datapath is far better than establishing no reservations.

In some instances, the reflector-A 320a maps the reservation established in the segment-A 325a and the other reservation established in the adjacent segment-B 325b onto one another. For example, a policy element, such as an authentication token, used in establishing the reservation in the segment-A 325a does not apply when establishing the other reservation in the adjacent segment-B 325b. As such, the reflector-A 320a establishes the reservation in the segment-A 325a using the authentication token, but attempts to establish the other reservation in the adjacent segment-B 325b without using the authentication token.

In another example, because of an administrative policy, a policy element, such as type of delivery, is translated from guaranteed delivery in the segment-A 325a to best effort in the adjacent segment-B 325b. In this way, the dataflow from the sender 310 to the receiver 315 is guaranteed delivery in the segment-A 325a, but is best effort in the adjacent segment-B 325b.

In an example embodiment, a reflector decides based on a policy decision whether to bind a reservation established in a segment to another reservation established in an adjacent segment to form a single bound reservation.

In another example embodiment a policy decision is communicated from a policy control entity not on an end-to-end datapath between a sender and a receiver, but is aware of the end-to-end datapath. Returning to the example illustrated in FIG. 3C, the COPS server 380 communicates the policy decision 378 to bind the reservation established in the first segment 372 to the other reservation established in the adjacent segment 376. The reflector 370, having been informed by the COPS server 380 of the policy decision 378, then binds the established reservations and forms a single bound reservation.

Returning to complete FIG. 3A, a reflector-C 320c and a reflector-D 320d each establishes a reservation in a respective segment, attempts to establish another reservation in a respective adjacent segment, and binds the reservation established in the segment with the other reservation established in the adjacent segment. In this way, a reservation for the complete end-to-end datapath 305 is established one segment at a time. However, as previously described, this is not always the case, but rather is the exception.

Figure 4:
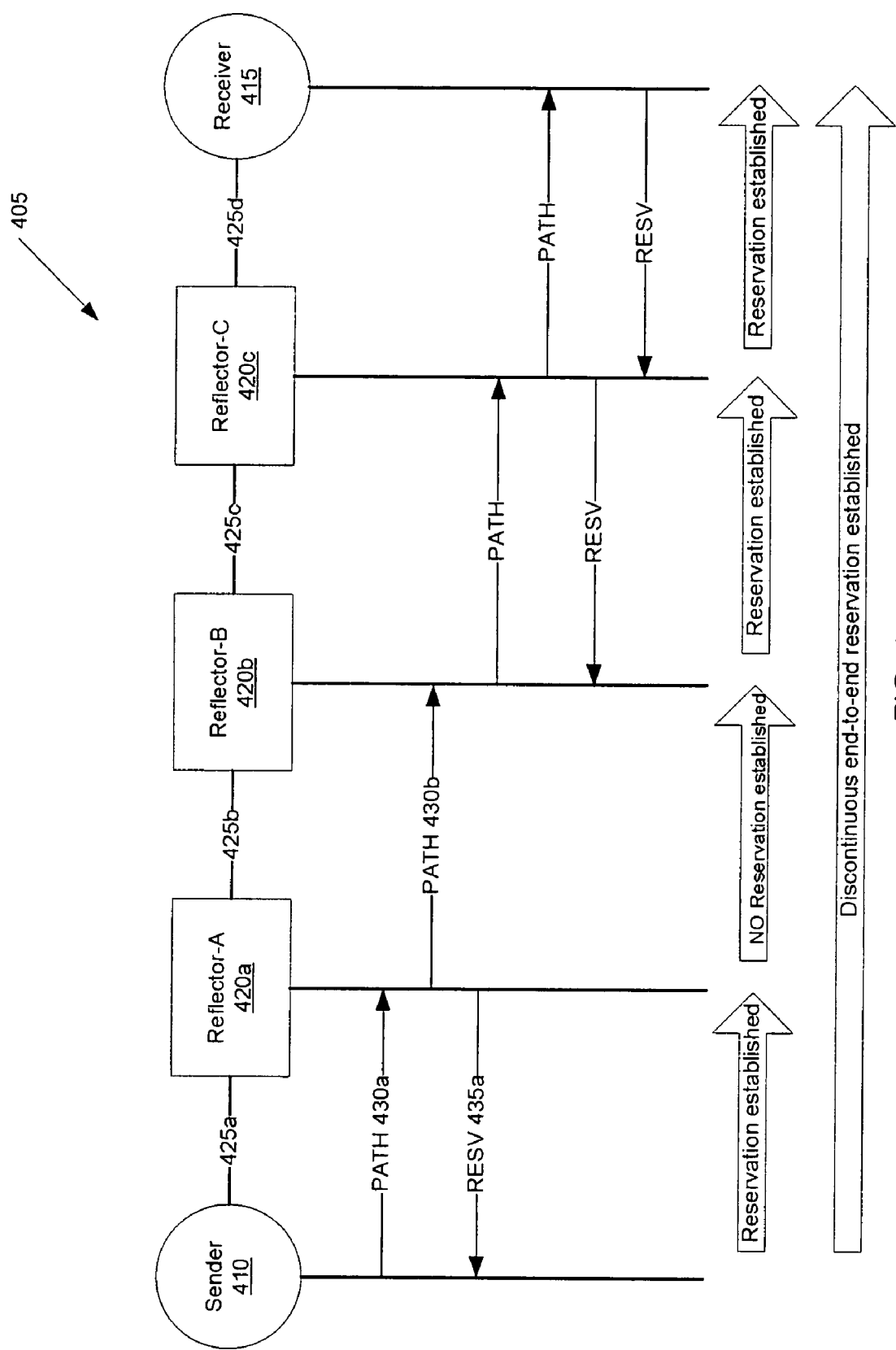
FIG. 4 is an example message diagram of establishing a discontinuous end-to-end reservation.

Because an end-to-end reservation is built one segment at a time, if any reflector chooses not to establish a reservation, existing established reservations are not adversely affected. Consider the case illustrated in FIG. 4.

In FIG. 4, again using RSVP as an example "on-path" reservation protocol, an example end-to-end datapath 405 exists between a sender 410 and a receiver 415. The end-to-end datapath 405 is segmented or otherwise divided into segments 425a . . . d by reflectors 420a . . . c. The sender 410 and the receiver 415 are internetworked by the reflectors 420a . . . c.

A reflector-A 420a establishes a reservation in a segment-A 425a up to a point in the end-to-end datapath 405 between the sender 410 and the receiver 415, namely, up to the reflector-A 420a as described previously. The reflector-A 420a attempts to establish a reservation in an adjacent segment, a segment-B 425b, downstream from the reflector-A 420a, also as described previously.

A reflector-B 420b, however, does not establish a reservation in the adjacent segment-B 425b because, for example, there are insufficient resources to accommodate the reservation (i.e., admission control failure) or there is policy-based decision not to establish the reservation in the adjacent segment-B 425b. No reservation is established in the adjacent segment-B 425b. No network layer resources are reserved for the data flow in the adjacent segment-B 425b.

Failure to establish a reservation in the adjacent segment-B 425b does not, however, adversely affect the reservation already established in the segment-A 425a. Network layer resources for the dataflow in the segment-A 425a are still reserved, and as such, the dataflow from the sender 410 to the receiver 415 still receives a quality of service at least in the segment-A 425a. Moreover, despite not establishing a reservation in the adjacent segment-B 425b, the reflector-B 420b attempts to establish still another reservation in a segment-C 425c.

In this way, a reflector acts as a completer of a reservation request by a previous hop, and in turn, attempts to establish a reservation in the downstream or forward direction toward a receiver. The reflector does so without allowing a failure to establish a reservation in a downstream segment to terminate or otherwise adversely affect a reservation established in an upstream segment toward a sender.

In this example, a reflector-C 420c and a reflector-D 420d each establishes a reservation in a respective segment, attempts to establish another reservation in a respective adjacent segment, and binds the reservation established in the segment with the other reservation established in the adjacent segment. A reservation established for the end-to-end datapath 405 is not complete, but discontinuous with no reservation established in the segment-B 425b. Nonetheless, network layer resources are reserved for the dataflow in at least a portion of the end-to-end datapath 405, and as such, the dataflow receives a quality of service in at least that portion.

Because no reservation was established in the segment-B 425b, but reservations were established in the segment-C 425c and the segment-D 425d, from the perspective of the reflector-A 420a, it may said be that reflector-A 420a continues to attempt to establish still other reservations in still adjacent segments. While no reservation was established in a segment immediately adjacent to the reflector-A 420*c* (i.e., in the segment-B 425*b*), reservations were established in segments still adjacent to the reflector-A 420*c* (i.e., in the segment-C 425*c* and the segment-D 425*d*). As such, establishing and attempting to establish a reservation in an immediately adjacent segment is distinguished from establishing and attempting to establish a reservation in a still adjacent segment.

This ability to reflect a reservation enables an "on-path" resource reservation protocol, such as RSVP to operate over part of the end-to-end datapath, and not be limited to the first hop segment, and/or the last hop segment.

In convenient embodiment, a reflector continues to attempt to establish a reservation after failing to establish the reservation initially. This refresh behavior may be useful, especially when a reservation is not established because of insufficient network layer resources. Once sufficient network layer resources are available, the reservation may be then established. In yet another convenient embodiment, a reservation may be re-established when an existing established reservation is torn down, for example when the established reservation is preempted.

Figure 5:
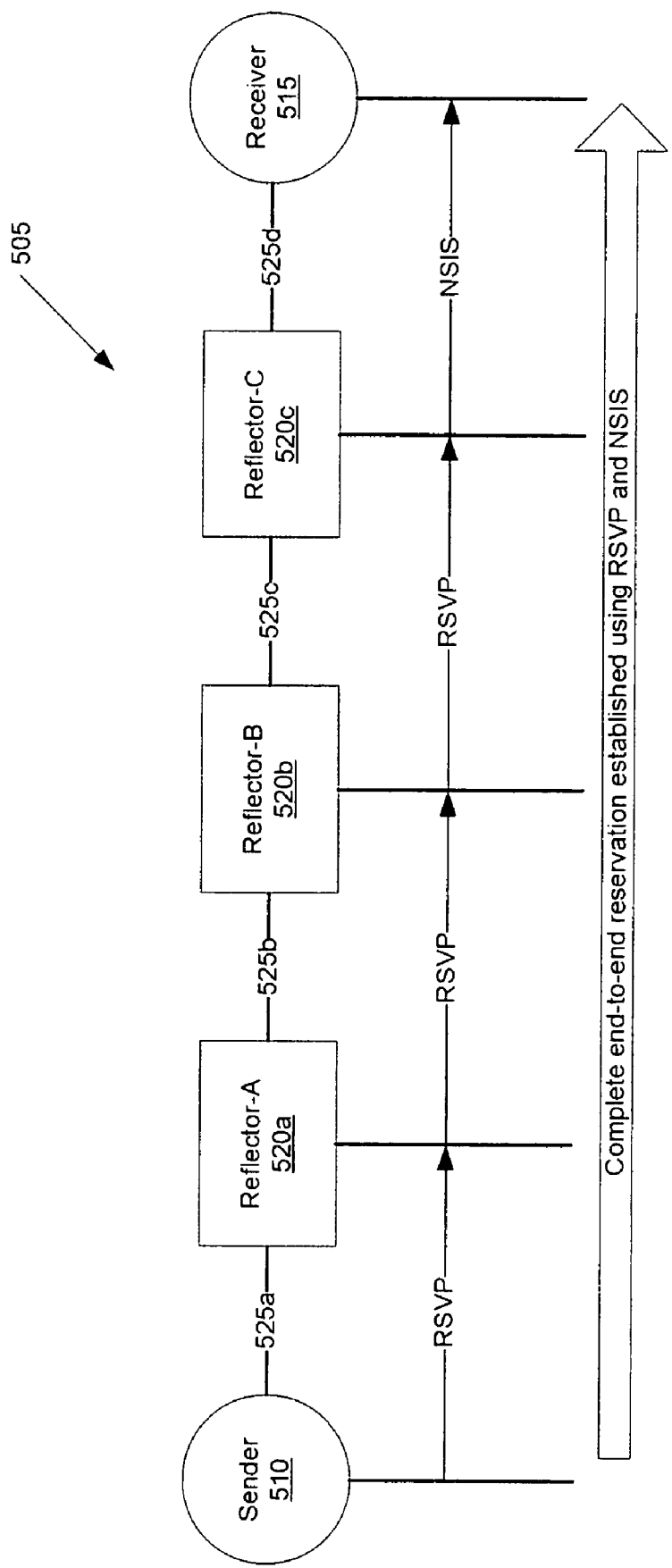
FIG. 5 is an example datapath having segments in which reservations are established using two different "on-path" resource reservation protocols.

In FIG. 5, an example end-to-end datapath 505 exists between a sender 510 and a receiver 515. The end-to-end datapath 505 is segmented or otherwise divided into segments 525*a* . . . *d* by reflectors 520*a* . . . *c*. The sender 510 and the receiver 515 are internetworked by the reflectors 520*a* . . . *c*. The reflectors 520*a* . . . *c* each establishes a reservation in a respective segment, attempts to establish another reservation in a respective adjacent segment, and binds the reservation established in the segment with the other reservation established in the adjacent segment as described above.

A reflector-C 520*c*, however, also acts a translation point between two "on-path" resource reservation protocols, in this example RSVP and Next Step In Signaling (NSIS). The reflector-C 520*c* interoperates a first resource reservation protocol (RSVP) establishing a reservation in segments-C 525*c* of the end-to-end datapath 505, up to the reflector-C 520*c* with a second resource reservation protocol (NSIS) establishing another reservation in an adjacent segments-D 525*d* of the end-to-end datapath 505 beyond the reflector-C 520*c*. In this way, the reflector-C 520*c* enables an administrative policy within each segment to control which reservation protocol is attempted for establishing a reservation per segment.

In this example, RSVP and NSIS, two different "on-path" reservation protocols, are used to complete an end-to-end reservation. One of ordinary skill in the art will readily recognize that example embodiments of the reflector function are also applicable to other "on-path" reservation protocols, such Network Layer Signaling (NLS). Accordingly, a reflector may interoperate RSVP with NSIS, RSVP with NLS or NSIS with NLS.

Because a dataflow is unidirectional in that data travels from a sender to a receiver, a reservation established for the dataflow is unidirectional as well. As such, to support bidirectional communications, that is, both the sender and the receiver both send and receive, in a convenient embodiment, the reflector function also attempts to establish a resource reservation in a segment of a reverse end-to-end path between the data sender and the data receiver.

Figure 6:
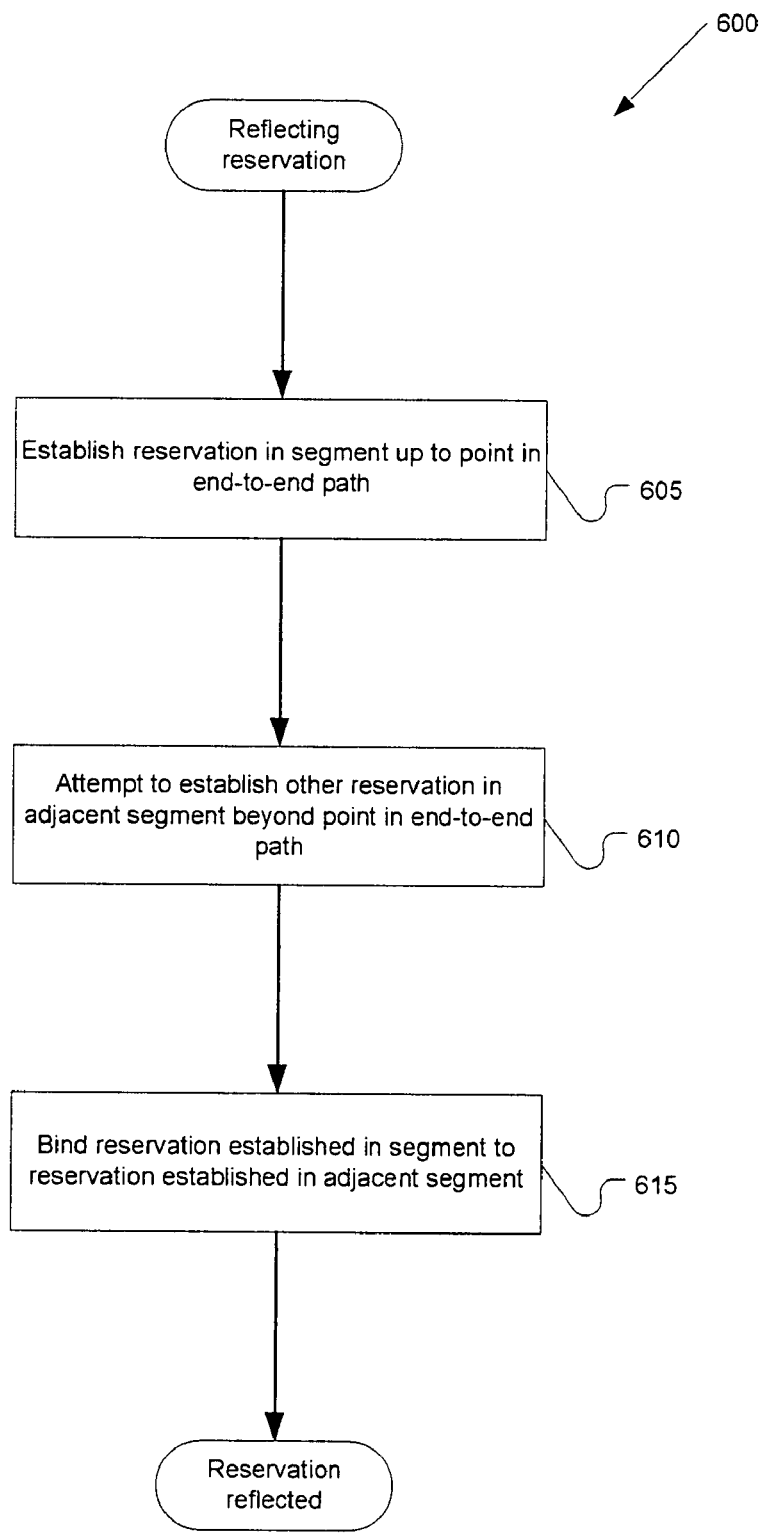
FIG. 6 is a flow diagram of an example process for reflecting a reservation.

In FIG. 6, an example process 600 reflects a reservation. The process 600 establishes (605) the reservation in a segment of an end-to-end datapath between a data sender and a data receiver, up to a point in the end-to-end datapath. The process 600 attempts (610) to establish another reservation in an adjacent segment of the end-to-end datapath, beyond the point in the end-to-end datapath. In an event, the other reservation is established in the adjacent segment of the end-to-end datapath, the process 600 binds (615) the other reservation to the reservation established in the segment of an end-to-end datapath up to the point in the end-to-end datapath. The process 600 ends with the reservation reflected.

To perform the foregoing, a reflector need not be invoked by a call signaling or controlling entity, such as a call configuration manager (CCM) or a session border controller (SBC). The reflector may be configured to reflect all messages for establishing and attempting to establish reservations. Alternatively, a message for establishing a reservation may itself contain a policy element which triggers the reflector along an end-to-end datapath to reflect messages for establishing and attempting to establish reservations.

Moreover to perform the foregoing, a reflector need not be a call signaling entity. For example, when the reflector attempts to establish a reservation, the reflector sends a PATH message having the same five-tuple (i.e., source address, destination address, protocol, source port, destination port) identifying the message as an original PATH message sent by a sender to a receiver. In this way, both the sender and the receiver do not have to know to which reflector along an end-to-end datapath to send the PATH and RSVP messages, i.e., the sender and the receiver do not have to understand anything special about the network topology of the end-to-end datapath.

In some instances, however, a reflector may provide some form of signaling or layer communications. For example, if a sender asks, for example, in Session Initiation Protocol (SIP) for preconditions with end-to-end reservations, the reflector sends back a segmented reservation indication. This segmented reservation indication changes from segmented reservation to end-to-end reservation if a receiver supports a same resource reservation protocol and the reservation is successfully established end-to-end.

It may be convenient for a reflector to also mark a Differentiated Services Code Point (DSCP) for a dataflow in a segment. The DSCP is a field in the header of an Internet Protocol (IP) packet classifying the packet for differentiated service or processing. In this way, the DSCP for the dataflow may be marked differently on a per segment basis and thus, processed accordingly. Alternately, the dataflow having a different DSCP in different segments may be mapped to single DSCP.

Figure 7A:
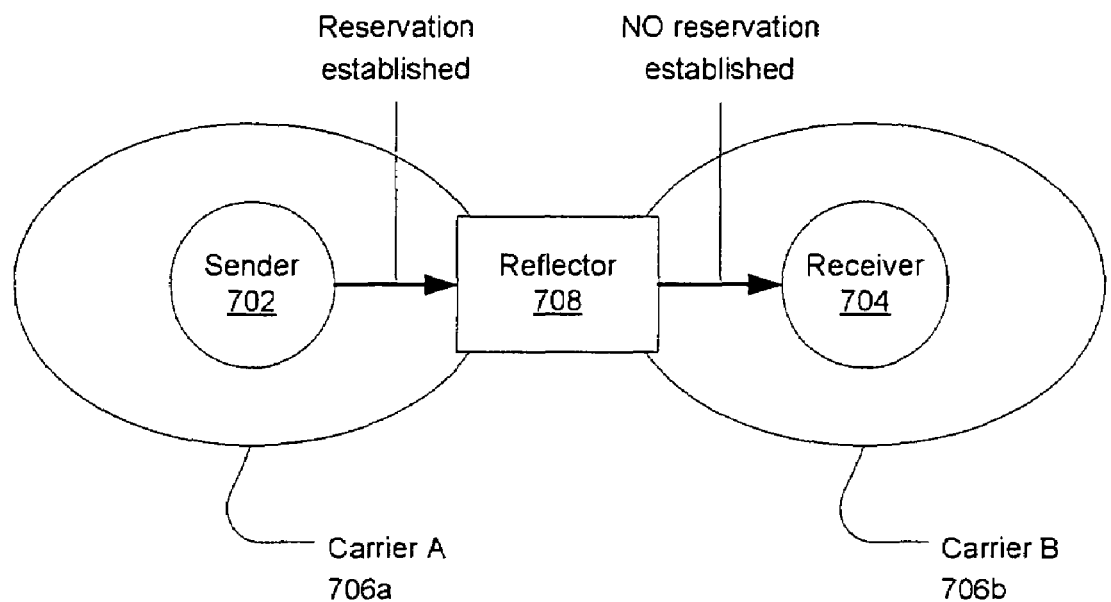
FIGS. 7A-D are diagrams of example networks and applications employing a reflector.

In FIG. 7A, a datapath exists between a sender 702 and a receiver 704. The sender 702 belongs to a first administrative domain 706*a* while the receiver 704 belongs to a second administrative domain 706*b*. Neither provider (e.g. carrier A and carrier B) allows a reservation to be established from outside its administrative domain. Consequently, an end-to-end reservation from the sender 702 to the receiver 704 is not possible.

A reflector 708 (e.g., an edge router implementing the aforementioned reflector function) is located at the perimeter of the first administrative domain 706*a* and the perimeter of the second administrative domain 706*b*. Acting as a reflection point, the reflector 708 establishes a reservation up to the perimeter of the first administrative domain 706*a* and attempts to establish a reservation beyond the perimeter of the second administrative domain 706*b* towards the receiver 704.

Unlike previous techniques for establishing a reservation, the reflector establishes the reservation up to at least the perimeter of the first administrative domain 706*a*. In this way, the provider of the first administrative domain 706*a* can offer its customers like the sender 702 a quality of service in at least the first administrative domain 706a independent of any implementation and/or policy decision made by the other provider of the second administrative domain 706b.

Figure 7B:
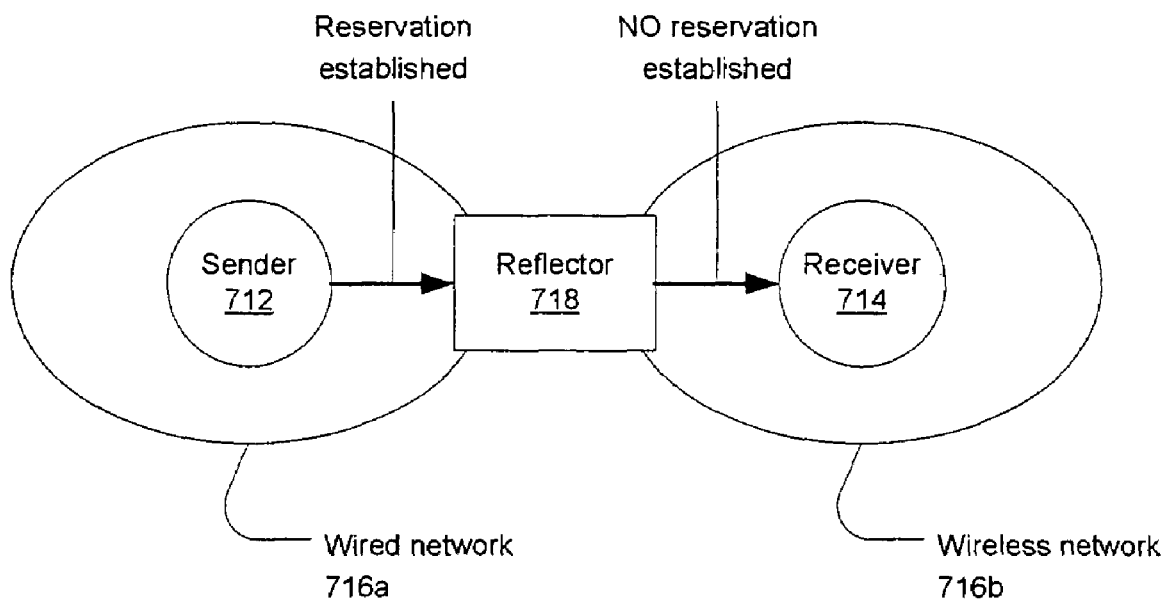

In FIG. 7B, a datapath exists between a sender 712 and a receiver 714. The sender 712 belongs to a wired network 716a (e.g., 802.3 or ETHERNET) while the receiver 714 belongs to a wireless network 716b (e.g., 802.11 or WIFI). There is no "on-path" resource reservation protocol support for the wireless network 716b. That is, for example, there is no RSVP support for establishing a reservation in an 802.11 wireless link or segment. Consequently, a reservation cannot be established in the wireless network 716b and an end-to-end reservation from the sender 712 to the receiver 714 is not possible.

A reflector 718 (e.g., an access point (AP) implementing the aforementioned reflector function) is located at the perimeter of the wired network 716a and the perimeter of the wireless network 716b. Acting as a reflection point, the reflector 718 establishes a reservation up to the perimeter of the wired network 716a and attempts to establish a reservation beyond the perimeter of the wireless network 716b towards the receiver 714. In this way, wireless endpoints like the receiver 714 can enjoy a quality of service beyond an AP, thereby increasing quality of communication with wireless links up to the AP being the only weak links.

Figure 7C:
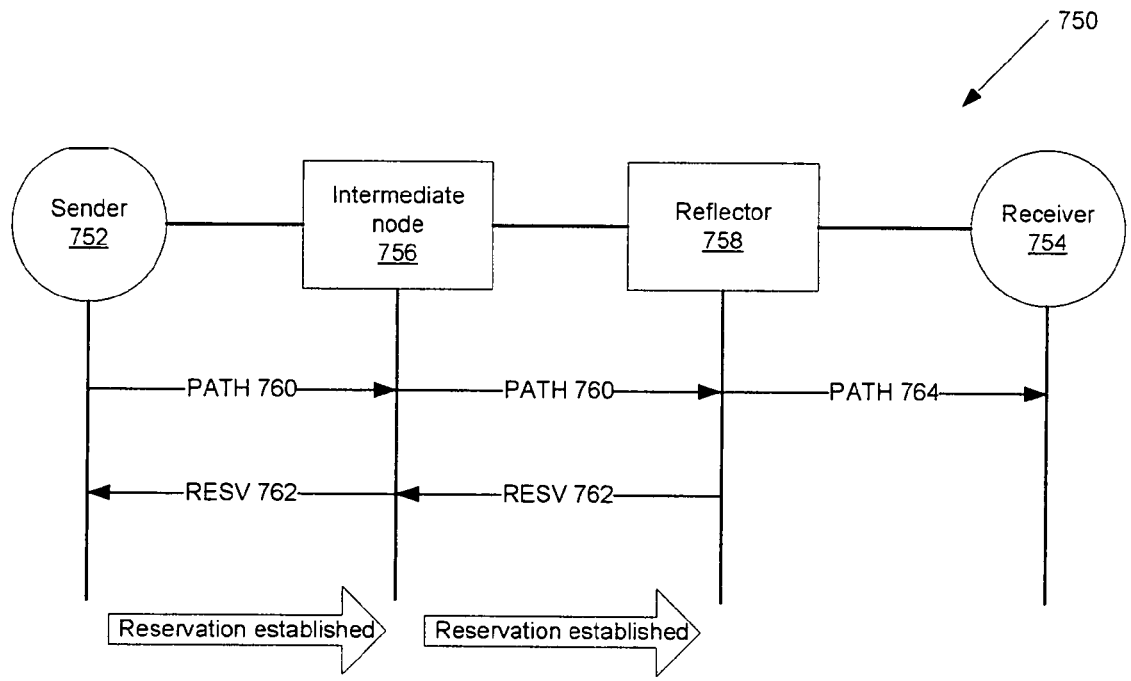

In FIG. 7C, a datapath 750 exists between a sender 752 and a receiver 754. The sender 752 and the receiver 754 are internetworked by an intermediate node 756 and a reflector 758. Unlike the intermediate node 756, the reflector 758 implements the aforementioned reflector function.

The sender 752 having application data to send to the receiver 754 initiates a resource reservation, in this example, by sending a PATH message 760 downstream on the datapath 750 towards the receiver 754. In accordance with RFC 2205, the intermediate node 756 forwards the first PATH message 760 downstream to the next hop on the datapath 750 towards the receiver 754, namely, the reflector 758.

In contrast to RFC 2205, however, the reflector 758 establishes a resource reservation in response to the PATH message 760. Rather than waiting for a RESV message from the next hop, the reflector 758 sends RESV message 762 upstream to the previous hop on the datapath 750 towards the sender 752, namely, the intermediate node 756. As such, the reflector 758 completes a reservation request from the previous hop (viz., the intermediate node 756) and establishes a reservation up to at least the reflector 758.

The intermediate node 756 receives the RESV message 762 from the reflector 758. In accordance with RFC 2205, the intermediate node 756 establishes a resource reservation as requested in the RESV message 762 and forwards the RESV message 762 upstream towards the sender 752. With a reservation established by the intermediate node 756 and the reservation established by the reflector 758, a reservation has been established up to at least the reflector 758.

In contrast to RFC 2205, the reflector 758 attempts to establish a resource reservation in response to the PATH message 760 by sending PATH message 764 downstream to the next hop on the datapath 750 towards the receiver 754. As described previously, the reflector 758 composes the PATH message 764 based on the received PATH message 760. In some instances, the reflector 758 may translate policy elements contained in the received PATH message 760.

As illustrated in the above example, a reflector having a reflector function works with an intermediate node to establish a reservation up to at least the reflector.

Figure 7D:
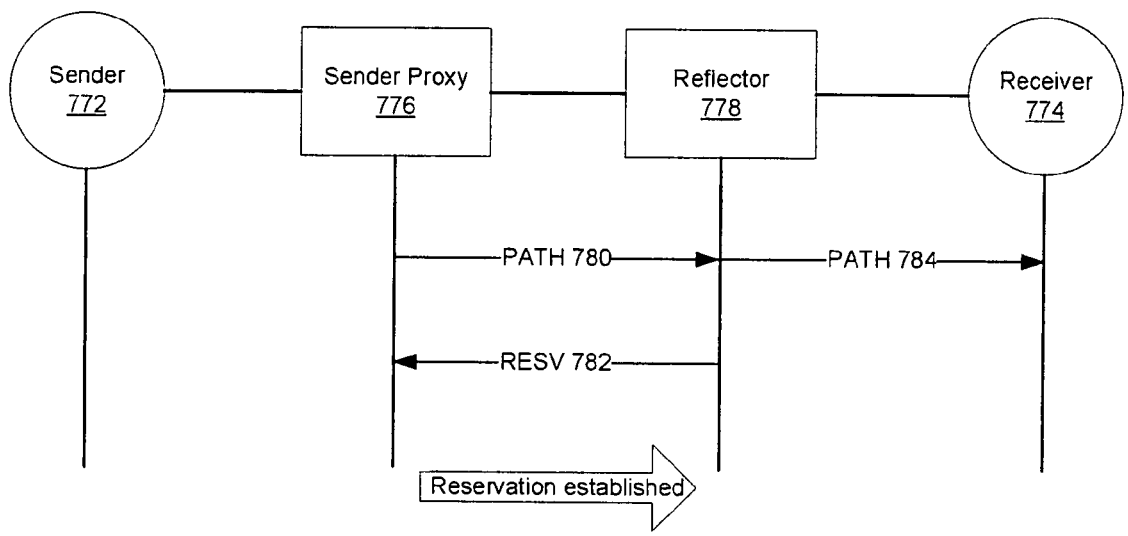

In FIG. 7D, a datapath 770 exists between a sender 772 and a receiver 774. The sender 772 and the receiver 774 are internetworked by an RSVP sender proxy 776 and a reflector 778. Unlike the previous example, the sender 772 is not capable establishing a reservation on its own. Defined in the Internet Engineering Task Force (IETF) Internet Draft entitled, "RSVP Proxy Approaches" by F. Le Raucheur et al., Oct. 13, 2006 (draft-lefaucheur-tsvwg-rsvp-proxy-00.txt), the RSVP sender proxy 776 somehow knows that it should generate all messages needed for the receiver 774 to establish a resource reservation.

Unlike the RSVP sender proxy 776, the reflector 778 implements the aforementioned reflector function. In contrast to the disclosed reflector function, the approaches described in the "RSVP Proxy Approaches" Internet Draft address the need to allow a resource reservation to be established in an end-to-end datapath between a sender and a receiver when the sender, receiver or both cannot participate in establishing the resource reservation themselves.

Continuing with FIG. 7D, the RSVP sender proxy 776 is informed that the sender 772 has application data to send to the receiver 774, for example, the RSVP sender proxy 776 is directed by a call manager or receives a trigger. The RSVP sender proxy 776 initiates a resource reservation on behalf of the sender 772 by sending a PATH message 780 downstream to the next hop on the datapath 770 towards the receiver 774, namely, the reflector 778.

The reflector 778 establishes a resource reservation in response to the PATH message 780. Rather than waiting for a RESV message from the next hop, the reflector 778 sends RESV message 782 upstream to the previous hop on the datapath 770 towards the sender 772, namely, the RSVP sender proxy 776. As such, the reflector 778 completes a reservation request from the previous hop (viz., the RSVP sender proxy 776) and establishes a reservation up to at least the reflector 778.

The reflector 778 attempts to establish a resource reservation in response to the PATH message 780 by sending PATH message 784 downstream to the next hop on the datapath 770 towards the receiver 774. As described previously, the reflector 778 composes the PATH message 784 based on the received PATH message 780. In some instances, the reflector 778 may translate policy elements contained in the received PATH message 780.

As illustrated in the above example, a reflector having a reflector function works with an RSVP sender proxy to establish a reservation up to at least the reflector.

Figure 8:
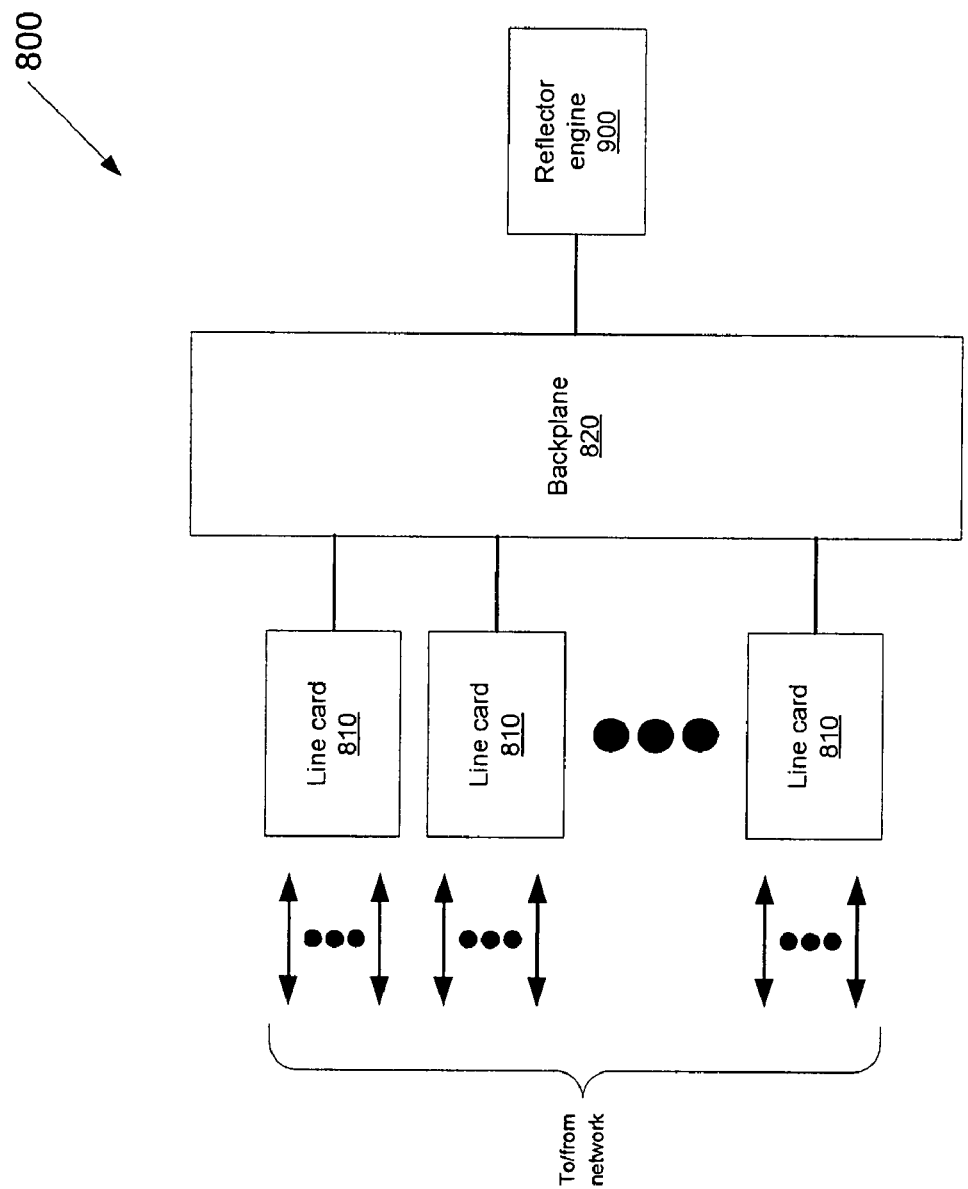
FIG. 8 is a high-level partial block diagram of a reflector.

FIG. 8 is a high-level partial block diagram of a reflector 800. Illustratively, the reflector 800 is an intermediate node, such as router, comprising one or more line cards 810 and a reflector engine 900 interconnected by a backplane 820. The reflector 800 is configured to perform various conventional layer-2 (L2) and layer-3 (L3) switching and routing functions including forwarding and processing data packets in accordance with the inventive technique. As used herein, L2 and L3 refer to the data-link layer and network layer, respectively, of the Open Systems Interconnection Reference Model (OSI-RM). The reflector 800 may also be configured to support various combinations of protocols including, e.g., Open Shortest Path First (OSPF), Intermediate-System-to-Intermediate-System (IS-IS), TCP/IP, RSVP, Ethernet, Asynchronous Transfer Mode (ATM), and frame relay (FR).

The backplane 820 comprises point-to-point interconnections that interconnect the various cards and allows data and signals to be transferred between the cards. The line cards 810 connect (interface) the reflector 800 with a data network and enable the reflector 800 to transfer and acquire data packets to and from the network via ports using various protocols such as, e.g., ATM, Ethernet, and T3. To that end line cards 810 comprise conventional interface circuitry that incorporates signal, electrical and mechanical characteristics, and interchange circuits, needed to interface with the physical media of the network and protocols running over that media.

Functionally, the line cards 810 acquire data packets from the network via the ports and forward the data packets to the backplane 820, as well as transfer data packets acquired from the backplane 820 to the network via the ports. In this way, the line cards 810 are interfaces configured to internetwork, for example, a sender and a receiver. The ports may be conventional, e.g., ATM, Ethernet, Fast Ethernet (FE), Gigabit Ethernet (GE), and FR ports.

Figure 9:
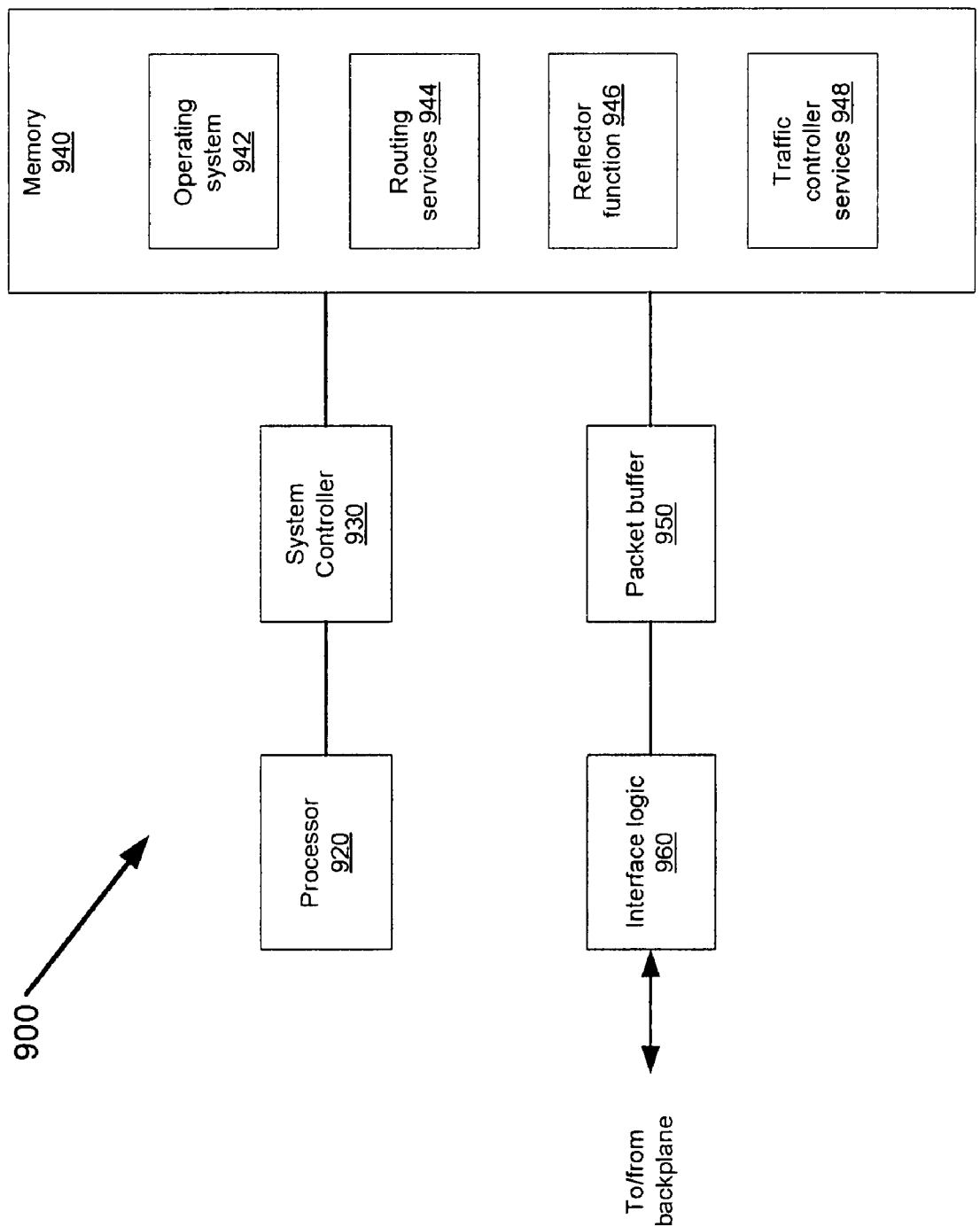
FIG. 9 is a high-level partial block diagram of a reflector engine of a reflector.

The reflector engine 900 comprises logic that is configured to manage the reflector 800, execute various protocols, such as RSVP, NIS, and NLS, and perform other functions including, reflecting reservations according to the foregoing example embodiments. FIG. 9 is a high-level partial block diagram of a reflector engine 900 that may be used with the foregoing example embodiments.

The reflector engine 900 comprises interface logic 960, packet buffer 950, system controller 930, processor 920 and memory 940. Interface logic 960 is coupled to the backplane 820, and is configured to transfer data between the backplane 820 and the reflector engine 900. Packet buffer 950 is a memory comprising high-speed RAM devices capable of storing data packets acquired by the interface logic 960 and processed by the processor 920. System controller 930 is coupled to the processor 920, memory 940 and packet buffer 950 and comprises circuitry configured to enable the processor 920 to access (e.g., read, write) memory locations contained in the memory 940 and the packet buffer 950. Processor 920 is a conventional central processing unit (CPU) configured to execute instructions contained in memory 940 for performing various functions in accordance with the foregoing example embodiments.

The memory 940 is a computer-readable medium comprising RAM devices, such as dynamic RAM (DRAM) devices, configured to implement e.g., a 128 Megabyte (MB) RAM. Memory 940 contains various software and data structures used by processor 920 including software and data structures that implement aspects of the foregoing example embodiments. Memory 940 contains operating system 942, routing services 944, reflector function 946 and traffic control services 948.

Operating system 942 functionally organizes the reflector 800 by invoking operations in support of software processes and services executing on the reflector engine 900, such as routing services 944, reflector function 946 and traffic control services 948. These services and processes may include software functions that implement various routing and switching protocols supported by the reflector 800 as well as functions that implement aspects of the present invention.

Routing services 944 contains software functions that implement various routing protocols, such as OSPF and IS-IS. These functions may be configured to manage a forwarding information database (not shown) containing, e.g., data used to make forwarding decisions.

Reflector function 946 contains software functions for reflecting a reservation. In particular, functions for: (i) establishing a reservation in a segment of an end-to-end path between a data sender and a data receiver, up to a point in the end-to-end path; (ii) attempting to establish another reservation in an adjacent segment of the end-to-end path, beyond the point in the end-to-end path; and (iii) in an event that, the other reservation is established in the adjacent segment of the end-to-end path, binding the other reservation to the reservation established in the segment of an end-to-end path up to the point in the end-to-end path.

While the foregoing example embodiments has been particularly shown and described with references to example embodiments thereof, it will be understood by those skilled in the art that various changes in form and details may be made therein without departing from the scope of example embodiment encompassed by the appended claims.

It should be understood that the network, message, flow, and block diagrams may include more or fewer elements, be arranged differently, or be represented differently. It should be understood that implementation may dictate the network, message, flow, and block diagrams and the number of network, message, flow, and block diagrams illustrating the execution of example embodiments.

It should be understood that elements of the network, message, flow, and block diagrams described above may be implemented in software, hardware, or firmware. In addition, the elements of the network, message, and flow diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method comprising:
   establishing a reservation in a segment of an end-to-end path between a data sender and a data receiver, up to a point in the end-to-end path;
   attempting to establish another reservation in an adjacent segment of the end-to-end path, beyond the point in an end-to-end path;
   in an event that the other reservation is established in the adjacent segment of the end-to-end path, binding the other reservation to the reservation established in the segment of an end-to-end path up to the point in the end-to-end path; and
   wherein binding includes in an event that the other reservation in the adjacent segment cannot be established, binding still other reservations established in still adjacent segments, beyond the point in the end-to-end path.

2. The method of claim 1 wherein establishing the reservation includes reserving network layer resources for a dataflow between the data sender and the data receiver in the segment of the end-to-end path, up to the point in the end-to-end path.

3. The method of claim 2 wherein reserving network layer resources includes responding to a received ReSerVation Protocol (RSVP) PATH message with a RSVP RESV message requesting network layer resources be reserved.

4. The method of claim 1 wherein establishing the reservation includes establishing the reservation in response to a path state of the end-to-end path between the data sender and the data receiver being stored.

5. The method of claim 1 wherein establishing the reservation includes establishing the reservation in response to receiving application data or a message between the data sender and the data receiver.

6. The method of claim 1 wherein establishing the reservation includes in an event that the reservation in the segment of the end-to-end path, up to the point, is no longer established, re-establishing the reservation.

7. The method of claim 1 wherein attempting to establish the other reservation includes attempting to reserve network layer resources for a dataflow between the data sender and the data receiver in the adjacent segment of the end-to-end path, beyond the point in the end-to-end path.

8. The method of claim 1 wherein attempting to establish the other reservation includes deciding based on a policy decision whether to attempt to establish the other reservation in the adjacent segment, beyond the point in the end-to-end path.

9. The method of claim 1 wherein attempting to establish the other reservation includes in an event that the other reservation in the adjacent segment of the end-to-end path, beyond the point, cannot be established initially, re-attempting to establish the other reservation.

10. The method of claim 9 wherein re-attempting to establish the other reservation includes continuing to attempt to establish still other reservations in still adjacent segments, beyond the point in the end-to-end path.

11. The method of claim 1 wherein binding includes mapping the reservation established in the segment and the other reservation established in the adjacent segment onto one another.

12. The method of claim 1 wherein binding the reservation to the other reservation includes deciding based on a policy decision whether to bind the reservation established in the segment with the other reservation established in the adjacent segment.

13. The method of claim 1 wherein binding the reservation to the other reservation includes interoperating a first resource reservation protocol establishing the reservation in the segment of the end-to-end path, up to the point with a second resource reservation protocol establishing the other reservation in the adjacent segment of the end-to-end path beyond the point.

14. The method of claim 13 wherein interoperating includes interoperating Resource ReSerVation Protocol (RSVP) with Next Step In Signaling (NSIS), RSVP with Network Layer Signaling (NLS) or NSIS with NLS.

15. The method of claim 1 further comprising attempting to establish a reservation in a segment of a reverse end-to-end path between the data sender and the data receiver, from the point in the reverse end-to-end path.

16. A method comprising:
establishing a reservation in a segment of an end-to-end path between a data sender and a data receiver, up to a point in the end-to-end path;
attempting to establish another reservation in an adjacent segment of the end-to-end path, beyond the point in an end-to-end path;
in an event that the other reservation is established in the adjacent segment of the end-to-end path, binding the other reservation to the reservation established in the segment of an end-to-end path up to the point in the end-to-end path;
wherein binding includes in an event that the reservation established in the segment and the other reservation established in the adjacent segment are the same, stopping the step of establishing the reservation in the segment; stopping the step of attempting to establish the other reservation in the adjacent segment; and stopping the step of binding the reservation established in the segment to the other reservation established in the adjacent segment.

17. An apparatus comprising:
means for establishing a reservation in a segment of an end-to-end path between a data sender and a data receiver, up to a point in the end-to-end path;
means for attempting to establish another reservation in an adjacent segment of the end-to-end path, beyond the point in the end-to-end path;
means for binding the other reservation to the reservation established in the segment of an end-to-end path up to the point in the end-to-end path in an event that the other reservation is established in the adjacent segment of the end-to-end path; and
in an event that the other reservation in the adjacent segment cannot be established, the means for binding binds still other reservations established in still adjacent segments, beyond the point in the end-to-end path.

18. An apparatus comprising:
an interface configured to internetwork a data sender to a data receiver forming an end-to-end path between the data sender and the data receiver; and
a reflector engine coupled to the interface configured to:
establish a reservation in a segment of the end-to-end path between the data sender and the data receiver, up to a point in the end-to-end path;
attempt to establish another reservation in an adjacent segment of the end-to-end path, beyond the point in the end-to-end path;
in an event that the other reservation is established in the adjacent segment of the end-to-end path, bind the other reservation to the reservation established in the segment of an end-to-end path up to the point in the end-to-end path; and
in an event that the other reservation in the adjacent segment cannot be established, bind still other reservations established in still adjacent segments, beyond the point in the end-to-end path.

19. A non-transitory computer readable storage medium with a software stored thereon for execution and when executed operable to:
establish a reservation in a segment of an end-to-end path between a data sender and a data receiver, up to a point in the end-to-end path;
attempt to establish another reservation in an adjacent segment of the end-to-end path, beyond the point in the end-to-end path;
in an event that the other reservation is established in the adjacent segment of the end-to-end path, bind the other reservation to the reservation established in the segment of an end-to-end path up to the point in the end-to-end path; and
in an event that the other reservation in the adjacent segment cannot be established, bind still other reservations established in still adjacent segments, beyond the point in the end-to-end path.

20. An apparatus comprising:
means for establishing a reservation in a segment of an end-to-end path between a data sender and a data receiver, up to a point in the end-to-end path;
means for attempting to establish another reservation in an adjacent segment of the end-to-end path, beyond the point in the end-to-end path;
means for binding the other reservation to the reservation established in the segment of an end-to-end path up to the point in the end-to-end path in an event that the other reservation is established in the adjacent segment of the end-to-end path;
in an event that the reservation established in the segment and the other reservation established in the adjacent segment are the same, the means for establishing stops establishing the reservation in the segment; the means for attempting stops attempting to establish the other reservation in the adjacent segment; and means for binding stops binding the reservation established in the segment to the other reservation established in the adjacent segment.

21. An apparatus comprising:
an interface configured to internetwork a data sender to a data receiver forming an end-to-end path between the data sender and the data receiver; and
a reflector engine coupled to the interface configured to:
establish a reservation in a segment of the end-to-end path between the data sender and the data receiver, up to a point in the end-to-end path;
attempt to establish another reservation in an adjacent segment of the end-to-end path, beyond the point in the end-to-end path;
in an event that the other reservation is established in the adjacent segment of the end-to-end path, bind the other reservation to the reservation established in the segment of an end-to-end path up to the point in the end-to-end path;
in an event that the reservation established in the segment and the other reservation established in the adjacent segment are the same, stop establishing the reservation in the segment; stop attempting to establish the other reservation in the adjacent segment; and stop binding the reservation established in the segment to the other reservation established in the adjacent segment.

22. A non-transitory computer readable storage medium with a software stored thereon for execution and when executed operable to:
establish a reservation in a segment of an end-to-end path between a data sender and a data receiver, up to a point in the end-to-end path;
attempt to establish another reservation in an adjacent segment of the end-to-end path, beyond the point in the end-to-end path;
in an event that the other reservation is established in the adjacent segment of the end-to-end path, bind the other reservation to the reservation established in the segment of an end-to-end path up to the point in the end-to-end path;
in an event that the reservation established in the segment and the other reservation established in the adjacent segment are the same, stop establishing the reservation in the segment; stop attempting to establish the other reservation in the adjacent segment; and stop binding the reservation established in the segment to the other reservation established in the adjacent segment.

* * * * *